Figure 1:
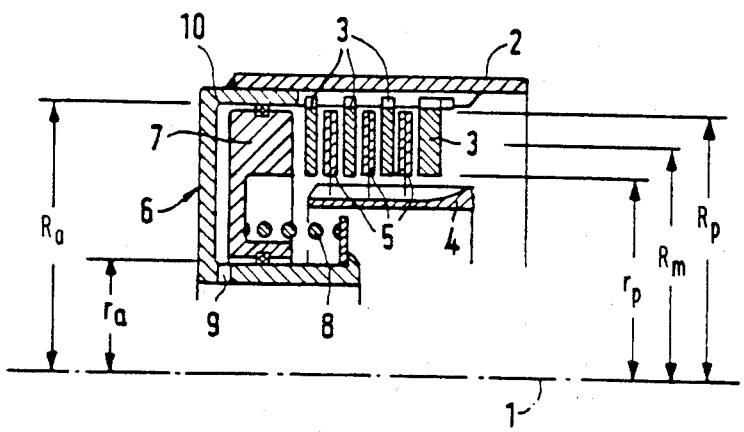

United States Patent [19]

Acker

[11] Patent Number: 4,503,734

[45] Date of Patent: Mar. 12, 1985

[54] CONTROL SYSTEM FOR VEHICULAR FRICTION-TYPE TRANSMISSION CLUTCH

[75] Inventor: Bernd Acker, Esslingen, Fed. Rep. of Germany

[73] Assignee: Daimler-Benz Aktiengesellschaft, Fed. Rep. of Germany

[21] Appl. No.: 402,235

[22] Filed: Jul. 27, 1982

[30] Foreign Application Priority Data

Jul. 28, 1981 [DE] Fed. Rep. of Germany ....... 3129681

[51] Int. Cl.³ .............................................. B60K 41/22
[52] U.S. Cl. ..................................... 74/866; 192/3.58; 192/103 R; 192/0.032
[58] Field of Search ................... 192/3.58, 3.57, 0.032, 192/0.033, 0.034, 0.076, 0.075, 103 R, 109 F, 192/0.052, 0.092; 74/866, 752 A, 336 R, 365

[56] References Cited

U.S. PATENT DOCUMENTS

| | | | |
|---|---|---|---|
| 3,898,893 | 8/1975 | Hashimoto et al. | 74/866 X |
| 3,942,393 | 3/1976 | Forster et al. | 74/752 A |
| 3,956,947 | 5/1976 | Leising et al. | 74/866 |
| 4,106,368 | 8/1978 | Ivey | 74/866 |

Primary Examiner—George H. Krizmanich
Attorney, Agent, or Firm—Craig & Burns

[57] ABSTRACT

An arrangement for regulating the torque transmitted by friction type gear shifting elements whereby, at every point in time throughout a previously specified time duration of a gear shifting operation, the clutch torque which is necessary at that point in time and is defined as a minimum torque, is computed utilizing measured values of an input and output rotational speed of a change-speed transmission or a gearbox, as well as measured values of an operating pressure of the friction-type gear shifting elements. At the minimum torque the relative rotational speed of the parts of the friction-type gear shifting elements, for example, parts of a friction-type clutch, a difference between an input and output speed of the change-speed transmission or gearbox remains constant. At the same time, an additional torque is computed in accordance with a prespecified function. The operating pressure of the friction-type gear shifting elements is then adjusted analogously to an output signal U, with the output signal being an analog of a sum of the necessary torque and additional torque.

5 Claims, 2 Drawing Figures

CONTROL SYSTEM FOR VEHICULAR FRICTION-TYPE TRANSMISSION CLUTCH

The present invention relates to a regulating arrangement and, more particularly, to an arrangement for regulating torque transmission by friction-type gear shifting elements in change-speed transmissions or gear boxes wherein gear shifting is accomplished under a load, with the arrangement including measured value sensor means for sensing and transmitting input and output speeds of the change-speed transmission, and an electronic control device which utilizes the input output speed signals from the measured value sensor means to generate an output signal for controlling a pressure of the friction-type gear shifting elements.

Regulating arrangements of the aforementioned type are proposed in, for example, Offenlegungsschrift Nos. 2,835,051 and 2,124,024, with these arrangements being intended to fulfill the purpose of accomplishing gear shifting in change-speed transmissions having a large number of speeds with the control of such change-speed transmission, as a rule, being no longer possible solely by means of hydraulic and/or mechanical measures.

A disadvantage of the above-proposed regulating arrangements resides in the fact that such arrangements do not ensure a sufficient reproducibility of a predetermined gear shifting behavior due to the fact that, in particular, no gear shifting time within which a gear shifting operation should be concluded is specified or determined in advance.

The aim underlying the present invention essentially resides in providing a regulating arrangement for regulating torque transmission by friction-type gear shifting elements such as, for example, clutch plates of a change-speed transmission, which arrangement enables a pressure at which the clutch plates are pressed together to be controlled in such a manner that a relative rotational speed between the clutch plates is brought to zero within a preselectable or gear shifting time reguardless of all external influences.

In accordance with advantageous features of the present invention, a regulating arrangement of the aforementioned type is proposed wherein an additional measured value sensor means or transmitter is provided for determining the clutch pressure, with the additional sensor means being located on an input side of a control device. The control device is adapted to generate, within presetable gear shifting times, an output signal which satisfies the following relationship:

$$U(t) = a_2 \mu p(t) - 1/a_1 \dot{\eta}(t) + f(t) \eta(t), \tag{1}$$

wherein:

T = a duration of gear-shifting operation, that is, gear-shifting time;
t = a point in time during a gear shifting operation, that is, $0 \leq t \leq T$;
p(t) = the clutch pressure at a point in time t;
$a_1, a_2$ = predetermined of prespecified constants;
$\mu$ = the coefficient of friction of the friction elements, i.e. friction clutch;
$\eta(t)$ = the relative rotational speed of the clutch element at the point in time t;
$\dot{\eta}(t)$ = a differential, with respect to time, of the relative rotational speed at the point in time t; and
f(t) = a predetermined continuous function specified in advance for which the following relationship applies:

$$f(0)\eta(0) = f(T)\eta(T) = 0 \tag{2}$$

The present invention is based upon the premise or knowledge that a torque $M_C$ transmitted by a friction element such as a friction clutch is additively made up from a torque $M_{CN}$, necessary at the moment in question, and from an additional $M_{CE}$, with $M_{CN}$ representing the minimum clutch torque which is necessary in order to maintain an instantaneous relative rotational speed of the clutch plates at a constant value, with a change in the relative rotational speeds of the clutch plates, as a function of time, being determined solely by the excess torque $M_{CE}$.

It is thus generally true that the relative rotational speed of the clutch plates of the friction clutch increases when the torque $M_C$, transmitted by the friction clutch, is less than the necessary torque $M_{CN}$, and decreases when the transmitted torque $M_C$ is greater than the necessary torque $M_{CN}$. If $M_C = M_{CN}$, the relative rotational speed, that is, the difference between the respective speeds of the clutch plates of the friction clutch, remains constant.

Therefore, if the necessary torque $M_{CN}$, which incidentially corresponds to an average torque transmitted by the clutch in a closed or engaged state, can be determined sufficiently accurately, it is then possible by specifying an excess torque $M_{CE}$, to predetermine the relative rotational speed of the clutch plates within a gear shifting time T.

The torque transmitted by the clutch may take the following relationship:

$$M_C = a_2 \mu p(t) = M_{CN} + M_{CE} \tag{3}$$

The excess torque may be represented in accordance with the following relationship:

$$M_{CE} = (1/a_1)\dot{\eta}(t) \tag{4}$$

In accordance with the present invention, since $M_{CN} = M_C - M_{CE}$, the necessary torque is consequently found for each point in time during a gear shifting operation, which is concluded within the gear shifting time T from a measured clutch pressure p, and from a variation, as a function of time, of the relative rotational speed of the clutch plates of the friction clutch which, in a straightforward manner, may be determined by measuring or sensing input and output speeds of the change-speed transmission or gear box.

The general concept underlying the present invention is a determination of a value of a torque $M_{CN}$ which is necessary at any particular given instant and is superimposed on the torque value and excess torque value. The torque value $M_{CN}$ is determined by measuring or sensing the input and output speeds of the change-speed transmission or gear box together with the clutch pressure while the excess torque $M_{CE}$ is determined from a predetermined function f(t) and from a measured or sensed relative rotational speed of the clutch plates of the friction clutch. Since a variation of the relative rotational speed between the clutch plates, as a function of time, is determined solely by the excess torque $M_{CE}$, and since, the necessary torque $M_{CN}$ may readily be determined by measurements at any point in time, it is possible in accordance with advantageous features of the present invention to achieve a precisely predetermined gear shifting behavior accompanied by a gear shifting time which may be specified in advance and it is merely necessary that the function $f_t$ satisfy the above noted relationship.

Preferably, in accordance with still further features of the present invention, the function $f(t)$ satisfies the following relationship:

$$f(t) = \frac{1}{T-t}\left[1 - e_2 - (e_1 - e_2)*\left(\frac{T-t}{T}\right)^j\right]\frac{1}{a_1} \tag{5}$$

In the above-noted relationship for the function $f_t$, a curve described in the relative rotational speed $\eta(t)$ within a gear shifting time T specified for a particular gear shifting operation, has the following relationship:

$$\eta(t) = \eta_0\left(\frac{T-t}{T}\right)^{1-e_2} e^{\left(\frac{-e_1-e_2}{j}\right)}\left[\left(\frac{T-t}{T}\right)^j - 1\right] \tag{6}$$

Wherein $\eta_0$ equals a constant, and $e_1$, $e_2$ and $j$ are preselected rational numbers.

Since, in this instance, the relative rotational speed disappears at a point in time $t = T$, a freedom from any jerking or uneven shifting is guaranteed at the end of the gear shifting operation regardless of the choice of the constant $e_1$, $e_2$ and $j$ the values of which are specified in advance.

A freedom from a jerking or uneven shifting may also be achieved at a beginning of a gear shifting operation if, in accordance with the present invention, the value of $e_1$ is equal to 1 for, in this manner, the differential, with respect to time, of the relative rotational speed disappears at a point in time $t = 0$.

It is possible, for example, with regard to comfort in shifting or the like to use constants $e_2$ and $j$ which may be freely specified in advance to define a maximum rate of change of the additional torque $M_{CE}$, that is, the second differential, with respect to time, $\ddot{\eta}(t)$ of the relative rotational speed of the clutch plates at the beginning of the gear shifting operation by virtue of the following relationship:

$$\ddot{\eta}(t = 0) = \frac{-\eta_0}{T^2}j(1 - e_2) \tag{7}$$

Furthermore, with regard to both comfort and wear of the component parts, both the absolute level of the maximum value of the additional torque $M_{CE}$, and a point in time $t_M$ at which the value occurs, that is, the maximum rate of change of the relative rotational speed may also be determined in accordance with the following relationships:

$$t_M = j\sqrt{\frac{1}{1 - e_2}\left(\frac{j+1}{2} - e_2 - \sqrt{\left(\frac{j+1}{2}\right)^2 - e_2 j}\right)} \tag{8}$$

$$\ddot{\eta}(t = t_M) = \frac{-\eta_0}{T}(1 - e_2)t_M - e_2(1 - t_M^j)e^{-\frac{1-e_2}{j}(t_M^j - 1)}$$

In accordance with the present invention, it may also be ensured that the relative rotational speed $\eta$ decreases or falls once the gear shifting time T has elapsed to approximately zero without any jerk or uneven operation even when, for comfort related reasons, it is necessary to limit the torque $M_C$ transmitted by the friction elements such as a friction clutch or to limit a variation as a function of time, or when the dynamic characteristics of the actuation elements which are controlled by electronic control means do not permit the torques to be varied in the manner desired by the control unit.

The constants $a_1$, $a_2$ are predetermined by the construction of the change-speed transmission or gear box and, in some cases, by an overall design consideration of the vehicle in which the change-speed transmission or gear box is installed. A determination of the values for the constants $a_1$, $a_2$ may be determined in advance by the following relationship:

$$a_1 = \frac{c_2 = i^2 c_1 + 2i c_3}{c_1 c_2 - c_3^2}\lambda' \tag{9}$$

Wherein:

$c_1$ = the total moment of inertia of the engine and driveline disposed forwardly of the change-speed transmission or gear box;

$c_2$ = denotes the total moment of inertia of the drive-line following the gearbox or change-speed transmission, including the differential and vehicle body;

$c_3$ = an inertial mass of the coupling shafts in the planetary gear system which are rotating with the remainder of the system;

$\lambda$ = a servo-moment factor;

$i$ = a transmission ratio of the gear of the change-speed transmission which is to be engaged;

$i_R$ = the number of friction surfaces or number of plates in the friction element such as a friction clutch;

$R_m$ = an equavalent frictional radius of the plates of the friction clutch; and $F$ = a cross section of a cylinder-piston unit 6 for applying pressure to friction surfaces and/or friction plates of the friction element.

The coefficient of friction $\mu$ may, in accordance with the present invention, be determined from the following relationships:

$$M_C = M_{CN} + M_{CE}, \tag{10}$$

$$M_C = a_2 \mu p(t) \tag{11}$$

$$M_{CE} = (1/a_1)\dot{\eta}(t) \tag{12}$$

from the above relationship it follows that, for a point in time where $t = t_1$ within a gear-shifting time-interval T, the following relationship applied:

$$a_2 \mu p(t_1) = M_{CN}(t) + 1/a_1 \dot{\eta}(t_1) \tag{13}$$

and, for a subsequent point in time $t_2 = t_1 + \Delta T$, where $\Delta t$ is a time interval defined by a timer in the control means, the following relationship applied:

$$a_2 \mu p(t_2) = M_{CN}(t_2) + 1/a_1 \eta(t_2), \tag{14}$$

If $a_1$, $a_2$ and $\mu$ are presumed to be constant and it is assumed that:

$$M_{CN}(t_1) = M_{CN}(t_2), \tag{15}$$

a subtraction of equations (11) and (12) yields a value for a coefficient of friction having the following relationship:

$$\mu = \frac{1}{a_1 a_2} \frac{\dot{\eta}(t_1) - \dot{\eta}(t_2)}{p(t_1) - p(t_2)} \quad (16)$$

wherein: $0 \leq t_1 < t_2 \leq T$,
wherein $t_1$ and $t_2$ are two successive time-intervals defined by the control means.

In performing the above calculation, it is particularly advantageous when the values for $a_1$ and $a_2$, which may have been incorrectly specified in advance, are compensated to a large extent by appropriately altering the calculated coefficient of friction $\mu$. It is thus sufficient to specify mean or average, constant values for $a_1$, and $a_2$, for example, for a mean or average vehicle weight, without thereby significantly altering the gear shifting behavior when the vehicle characteristics change due to, for example, load changes of the vehicle.

Accordingly, it is an object of the present invention to provide an arrangement for regulating torque transmitted by friction-type gear shifting elements in change-speed transmissions or gearboxes which avoids, by simple means, shortcomings and disadvantages encountered in the prior art.

Another object of the present invention resides in providing an arrangement for regulating a torque transmitted by friction-type gear shifting elements in change-speed transmission or gearboxes, wherein gear shifting is accomplished under a load, which functions realiably under all operating conditions of the change-speed transmission or gear box.

Yet another object of the present invention resides in providing an arrangement for regulating torque transmitted by friction-type gear shifting elements in change-speed transmissions or gearboxes, wherein gear shifting is accomplished under a load, which defines a minimum torque necessary for a gear shifting time by utilizing measure values of input and output rotational speed of the change-speed transmission or gearbox.

A still further object of the present invention resides in providing an arrangement for relating torque transmitted by friction-type gear shifting elements in change speed transmissions or gearboxes, wherein gear shifting is accomplished under a load, which is simple in construction and therefore relatively inexpensive to manufacture.

Figure 2:
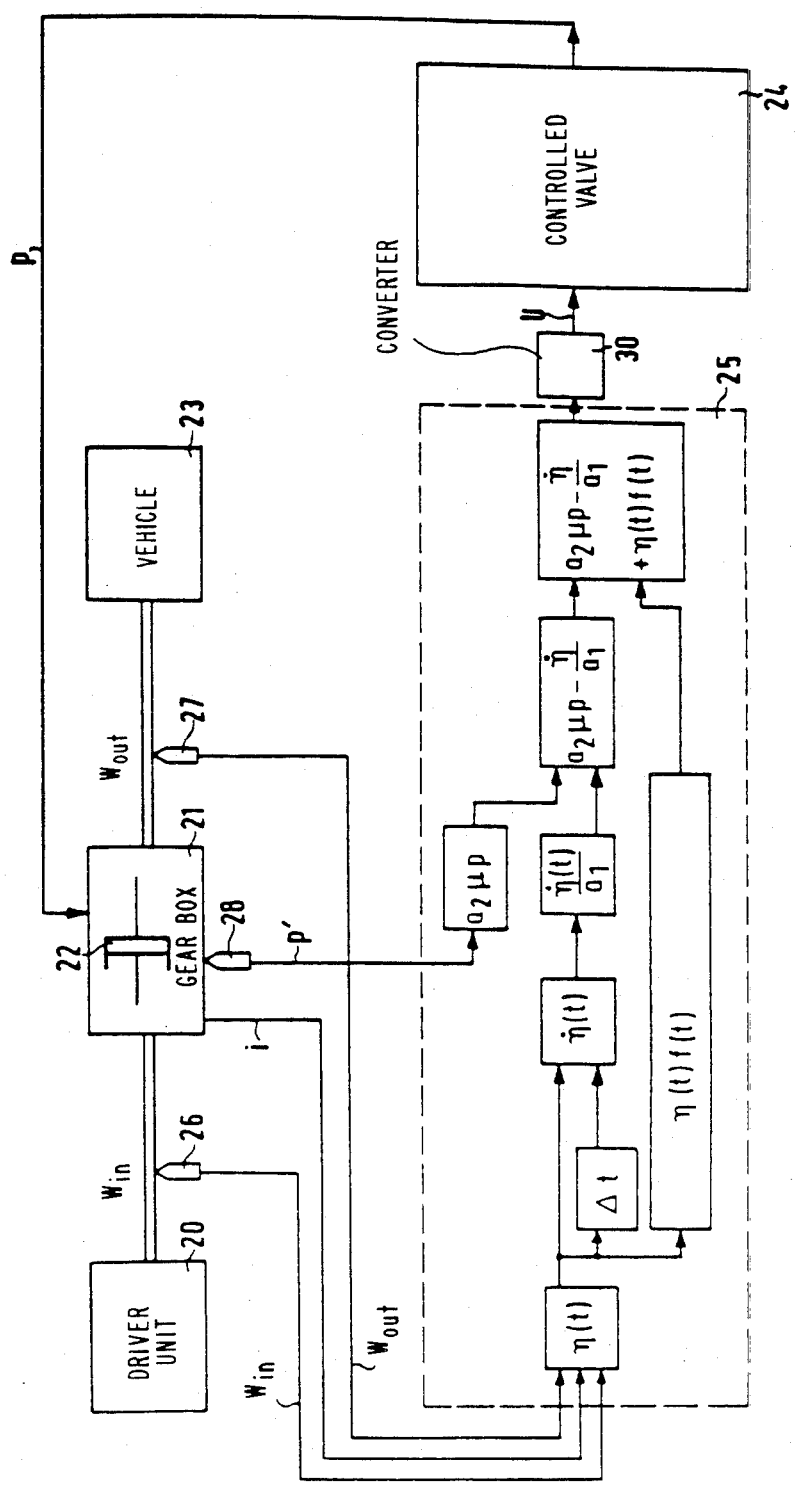

These and other objects, features, and advantages of the present invention will become more apparent from the following description when taken in connection with the accompanying drawings which show, for the purposes of illustration only, one embodiment in accordance with the present invention, and wherein:

FIG. 1 is a partially schematic cross sectional view through a multi-plate friction clutch adapted to be controlled by a regulating arrangement constructed in accordance with the present invention; and FIG. 2 is a schematic representation of an arrangement for regulating torque transmitted by friction-type gear-shifting elements constructed in accordance with the present invention.

Before describing, in detail, the particular improved arrangement for regulating the torque transmitted by friction-type gear shifting elements in accordance with the present invention, it should be observed that the present invention resides primarily in a novel structural combination of conventional components and not in the particular detailed configurations thereof. Accordingly, the structure, control, and arrangement of the conventional components and circuits have, for the most part, been illustrated in the drawings by readily understandable block representations and schematic diagrams, which show only those specific details that are pertinent to the present invention, in order to not obscure the disclosure with structural details which may be readily apparent to those skilled in the art having the benefit of the description herein. Thus, the schematic block diagram illustration of FIG. 1 does not necessarily represent the mechanical structural arrangement of the exemplary system, but is primarily intended to illustrate the major structural components of the system in a convenient functional grouping, whereby the present invention can be more readily understood.

Referring now to the drawings wherein like reference numerals are used in both views to designate like parts and, more particularly, to FIG. 1, according to this figure, a multi-plate clutch, of conventional construction, is rotationally symmetrically disposed with respect to an axis of rotation 1, with the clutch including an outer plate carrier 2 with outer plates located therein in such a manner so as to permit movement, and an inner plate carrier 4 provided with inner plates 5. A piston-cylinder unit generally designated by the reference numeral 6 is located on the outer plate carrier 2, with the unit 6 having an annular cross sectional configuration. An operating fluid such as, for example, oil, or the like, is fed through a bore 9 into an annular cylinder 10 of the cylinder-piston unit 6, whereby an annular piston 7 of the cylinder-piston unit 6 may be moved against a biasing pressure or force of a spring 8. During a movement of the annular piston 7, the piston 7 presses the outer plates 3 against the inner plates 5. The annular cylinder 10 has an outer radius $R_a$ and an inner radius $r_a$, with the inner plates 5 having an outer radius $R_p$ and an inner radius $r_p$. The equivalent frictional radius $R_m$ of the plates may be determined in a conventional manner by the following relationship:

$$R_m = \frac{2(R_p^3 - r_p^3)}{3(R_p^2 - r_p^2)} . \quad (17)$$

As shown in FIG. 2, the system which is to be controlled by the regulating arrangement of the present invention includes a drive means 20 such as an engine or the like, having connected thereto a change-speed transmission or gearbox 21 which includes a clutch 22, with the drive 20 being adapted to propel or drive a vehicle 23. A valve 24 is provided for adjusting the pressure p of the clutch 22, with the valve 24 being controlled by an electronic control means 25, which is adapted to provide appropriate output control signals U to a control device (not shown) with an actuating element of the control device effecting an adjustment of the valve 24.

The control unit 25 is coupled, on an input side thereof, to measured value sensors or transmitters 26, 27, with the sensor 26 adapted to sense or measure a rotational speed $\omega_{In}$ on an input side of the change-speed transmission or gearbox 21, and the other measured value sensor 27 determining a rotational speed $\omega_{Out}$ on an output side of the change-speed transmission of gearbox 21. An additional measured value sensor or transmitter 28 is, according to the present invention, provided for determining a clutch pressure, that is, a pressure in the piston-cylinder unit 6 with the sensor 28 transmitting a measured value signal p' as an additional input to the control unit 25.

A further signal i is supplied from the change-speed transmission or gearbox 21 to an input side of the control unit 25, with the signal i reproducing or representing a transmission ratio of a gear of the change-speed transmission or gearbox 21 which is to be engaged.

The Signal i is conventionally generated in a manually operated transmission by electrical switches which are closed (or opened) at respective positions of a gear shift handle; or in an automatic transmission, by shift command signals generated by a separate transmission control system such as that taught by U.S. Pat. No. 4,106,368.

The signals supplied to the input side of the control unit 25 are processed by the control unit 25 in the following manner:

The signal for the input side rotational speed $\omega_{In}$ of the change-speed transmission or gear box 21, and the signal for the output side rotational speed $\omega_{Out}$ are used to determine the relative rotational speed in accordance with the following relationship:

$$\eta = \omega_{In} - i\omega_{Out}. \qquad (18)$$

Firstly, the differential of the relative rotational speed, with respect to time, is determined from the relative rotational speed, for example, by a computation of the corresponding difference-quotients, with the differential then being multiplied by a factor of $1/a_1$.

Secondly, the relative rotational speed is multiplied by the function f(t).

The output signal generated by the measured value sensor 28 is multiplied by the constant $a_2$ and by the coefficient of friction $\mu$, thereby generating a signal corresponding to $a_2\mu p$. From this signal, the signal corresponding to $1/a_1\dot{\eta}(t)$ is subtracted, and the resulting signal is added to the signal corresponding to the product $\eta(t)f(t)$. A cumulative signal is thereby formed which is converted, in an end stage 30, into the corresponding analog output signal U.

The coefficient of friction $\mu$ can be calculated by the control unit 25 whenever a gear shifting operation is about to commence, with such calculation being carried out in accordance with the relationship (16) noted hereinabove.

It is possible, in accordance with the present invention, to utilize a microprocessor which is available in the vehicle for other purposes such as, for example, controlling the ignition or braking system of the vehicle, to function as the control unit 25.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. An arrangement for regulating a torque transmitted by friction-type gear-shifting means in a change-speed transmission means, wherein a gear shifting is accomplished under a load, the gear shifting means including a multiplate friction clutch means, the arrangement comprising a first sensor means for sensing an input speed of the transmission means and for providing an output signal of a sensed input speed, a second sensor means for sensing an output signal of the transmission means and for providing an output signal of the sensed output speed, characterized in that a third sensor means is arranged at the transmission means for sensing an operating pressure of an operating fluid of the friction clutch means and for providing an output signal of a sensed operating pressure, and in that a control means is provided for receiving, as an input, the output signals of the first, second, and third sensor means and for generating, within a presetable gear shifting time, an output signal for the operating pressure of the friction clutch means which satisfies the following relationship: for $o < t < T$, $$U(t) = a_2\mu p(t) - 1/a_1\dot{\eta}(t) + f(t)\eta(t),$$

wherein:
T = a duration of the gear shifting operation, that is, a gear-shifting time,
t = a point in time during the gear-shifting operation, that is, $0 \leq t \leq T$;
p(t) = the operating pressure at the point in time t;
$a_1$, $a_2$ = constants specified in advance;
$\mu$ = a coefficient of friction of the friction clutch means;
$\eta(t)$ = a relative rotational speed between plates of the multiplate friction clutch means at the point in time t;
$\dot{\eta}(t)$ = a differential, with respect to time, of a relative rotational speed at a point in time t; and
f(t) = a continuous function, specified in advance, satisfying the following relationship:

$$f(0)\eta(0) = f(T)\eta(T) = 0.$$

2. An arrangement according to claim 1, characterized in that the continuous function f(t) satisfies the following relationship:

$$f(t) = \frac{1}{T-t}\left[1 - e_2 - (e_1 - e_2)^*\left(\frac{T-t}{T}\right)^j\right]\frac{1}{a_1}.$$

wherein $e_1$, $e_2$ and j are selectable rational numbers.

3. An arrangement according to claim 2, characterized in that $e_1$ equals 1.

4. An arrangement according to one of claims 1, 2, or 3, for a motor vehicle, characterized in that values for the constants $a_1$, $a_2$ are determined in accordance with the following relationship:

$$a_1 = \frac{c_2 + i^2 c_1 + 2i\, c_3}{c_1 c_2 - c_3^2}\lambda'$$

wherein:
$c_1$ = a total moment of inertia of the drive means of the vehicle and a drive line means located forwardly of the change-speed transmission means;
$c_2$ = a total moment of inertia of a drive-line located rearwardly of the change-speed transmission means, with the rearwardly located drive line including a differential and a body portion of the vehicle;
$c_3$ = an inertial mass of coupling shafts connected to a planetary gear means of the differential, which shafts rotate with a remainder of the system;

$\gamma$ = a servo-moment factor;
i = a transmission ratio of a gear of the change-speed transmission means to be engaged;
$i_R$ = a number of one of friction-surfaces and clutch plates in the friction clutch means;
$R_m$ = an equivalent frictional radius of the clutch plates of the friction clutch means; and
F = a cross section of a cylinder-piston means for applying the operating pressure to one of the friction surfaces and clutch plates of the friction clutch means.

5. An arrangement according to claim 4, characterized in that the coefficient of friction $\mu$ of the friction clutch means is determined in accordance with the following relationship:

$$\mu = \frac{1}{a_1 a_2} \frac{\eta(t_1) - \eta(t_2)}{p(t_1) - p(t_2)},$$

wherein:

$$0 \leq t_1 < t_2 \leq T,$$

with $t_1$ and $t_2$ being two successive time intervals determined by the control means.

* * * * *